(12) United States Patent
Kawamata

(10) Patent No.: US 7,619,530 B2
(45) Date of Patent: Nov. 17, 2009

(54) RFID TAG

(75) Inventor: Hiroshi Kawamata, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 141 days.

(21) Appl. No.: 11/288,146

(22) Filed: Nov. 29, 2005

(65) Prior Publication Data

US 2007/0040028 A1 Feb. 22, 2007

(30) Foreign Application Priority Data

Aug. 18, 2005 (JP) .............................. 2005-237731

(51) Int. Cl.
*G08B 13/14* (2006.01)

(52) U.S. Cl. ................... 340/572.7; 340/572.8; 29/829; 343/873

(58) Field of Classification Search ............. 340/572.7, 340/572.8, 572.1, 572.3; 29/829; 343/700 MS, 343/873, 806; 235/492

See application file for complete search history.

(56) References Cited

U.S. PATENT DOCUMENTS

| | | | |
|---|---|---|---|
| 5,939,984 A * | 8/1999 | Brady et al. | 340/572.1 |
| 6,384,727 B1 * | 5/2002 | Diprizio et al. | 340/572.7 |
| 6,666,380 B1 * | 12/2003 | Suzuya | 235/492 |
| 6,999,028 B2 * | 2/2006 | Egbert | 343/700 MS |
| 7,084,770 B2 * | 8/2006 | Brady et al. | 340/572.7 |
| 7,337,978 B2 * | 3/2008 | Lee | 235/492 |
| 7,345,643 B2 * | 3/2008 | Forster et al. | 343/806 |
| 2005/0012616 A1 * | 1/2005 | Forster et al. | 340/572.7 |

FOREIGN PATENT DOCUMENTS

JP 2002-366915 12/2002

* cited by examiner

*Primary Examiner*—Davetta W Goins
(74) *Attorney, Agent, or Firm*—Staas & Halsey LLP

(57) ABSTRACT

An RFID tag includes an RFID unit and an antenna unit. The RFID unit is formed in a form of a minute dipole antenna having a predetermined length and includes an IC chip. The antenna unit includes an antenna pattern and an RFID mounting portion. Lengths of the RFID unit and the antenna unit are substantially identical. The RFID unit and the antenna can be manufactured independently.

9 Claims, 5 Drawing Sheets

FIG.4
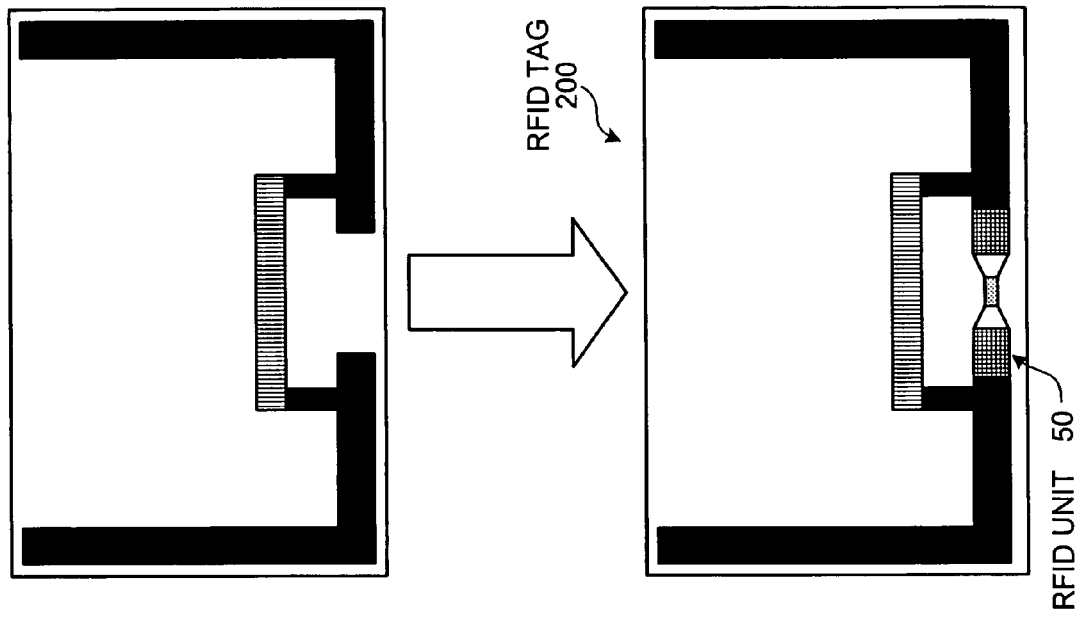
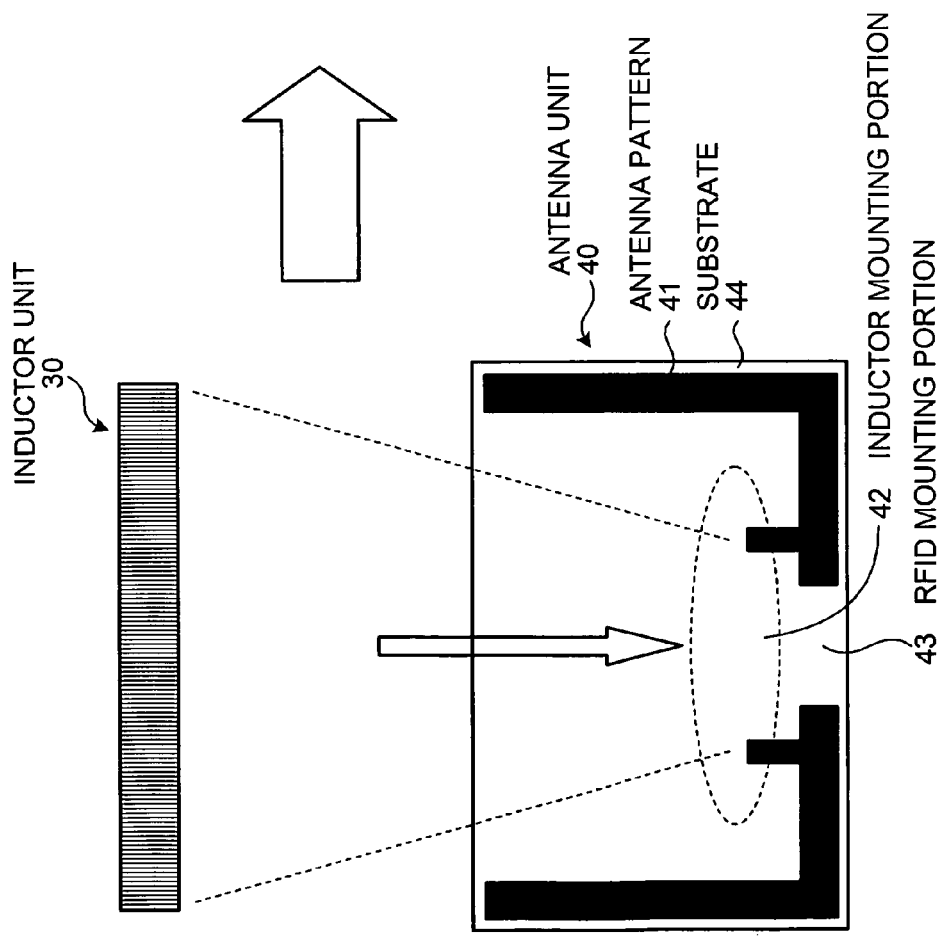

FIG.5
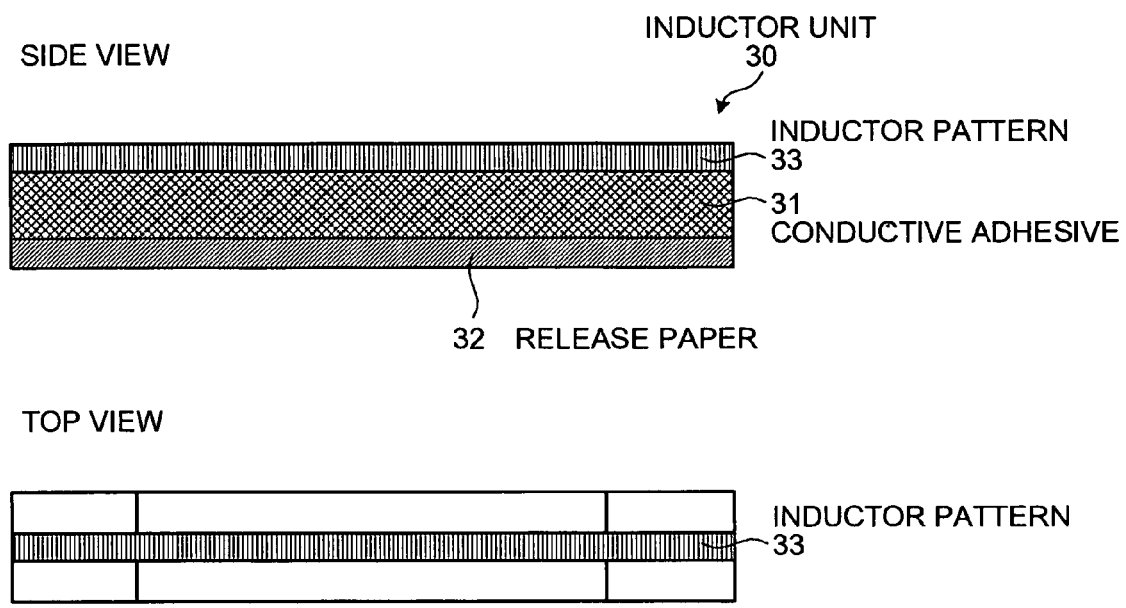
FIG.6
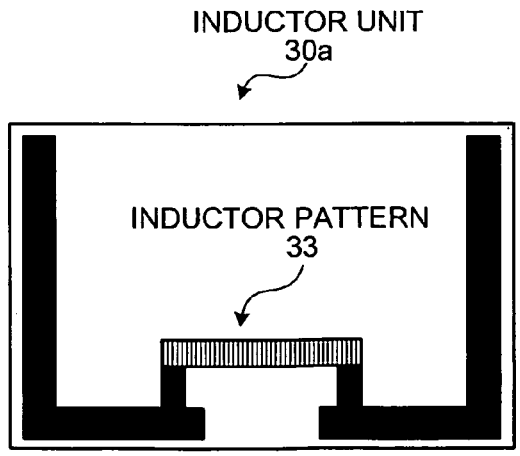
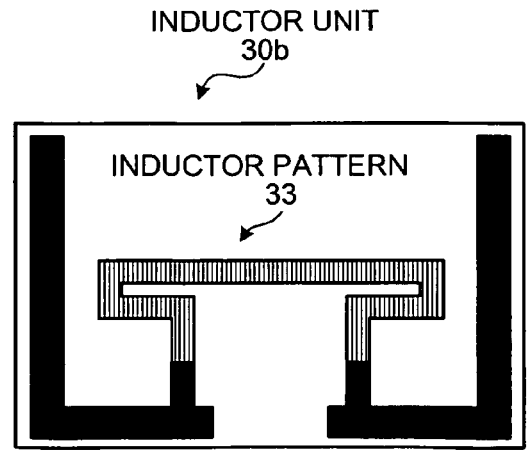

RFID TAG

BACKGROUND OF THE INVENTION

1. Field of the Invention

The present invention relates to a radio frequency identification (RFID) tag.

2. Description of the Related Art

In an identification technology for products, an RFID has come to be used in place of a barcode. The RFID is the technology that allows reading and writing of data from or into an RFID tag in a non-contact manner. The data is read and written by an RFID reader/writer. The RFID tag includes an integrated circuit (IC) chip, an antenna, and a substrate. The IC chip stores data such as its own identification code, and performs data exchange via the antenna with the RFID reader/writer. The IC chip is mounted on the antenna.

An internal layout of the RFID tag varies depending on a material to which the RFID tag is to be attached. In other words, an antenna pattern and a position of the IC chip on the antenna depend on the material. Therefore, in manufacturing the RFID tag, a manufacturing apparatus is adjusted so that the antenna pattern and the position of the IC chip are suitable for the material, and the antenna and the IC chip are formed in an integrated unit. For example, in a technology disclosed in Japanese Patent Application Laid-Open No. 2002-366915, an antenna having a pattern suitable for the material is inscribed or affixed on a substrate, and then, an IC chip is mounted on the antenna at a position suitable for material.

However, the above technology of manufacturing an RFID tag is not cost-effective because, by such a method of manufacturing an RFID tag, mass production of an RFID tag is difficult.

SUMMARY OF THE INVENTION

It is an object of the present invention to at least solve the problems in the conventional technology.

A radio frequency identification tag according to one aspect of the present invention includes an IC chip unit formed in a form of a dipole antenna; and an antenna unit including an antenna pattern and a chip mounting portion in which the IC chip unit is to be mounted. The IC chip unit and the chip mounting portion have a substantially identical length.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a schematic of an RFID tag according a second embodiment of the present invention;

FIG. 5 is a schematic of an inductor unit according to the second embodiment; and FIG. 6 is a schematic of the inductor unit according to the second embodiment.

DETAILED DESCRIPTION OF THE PREFERRED EMBODIMENTS

Exemplary embodiments according to the present invention will be explained in detail below with reference to the accompanying drawings.

Figure 1:
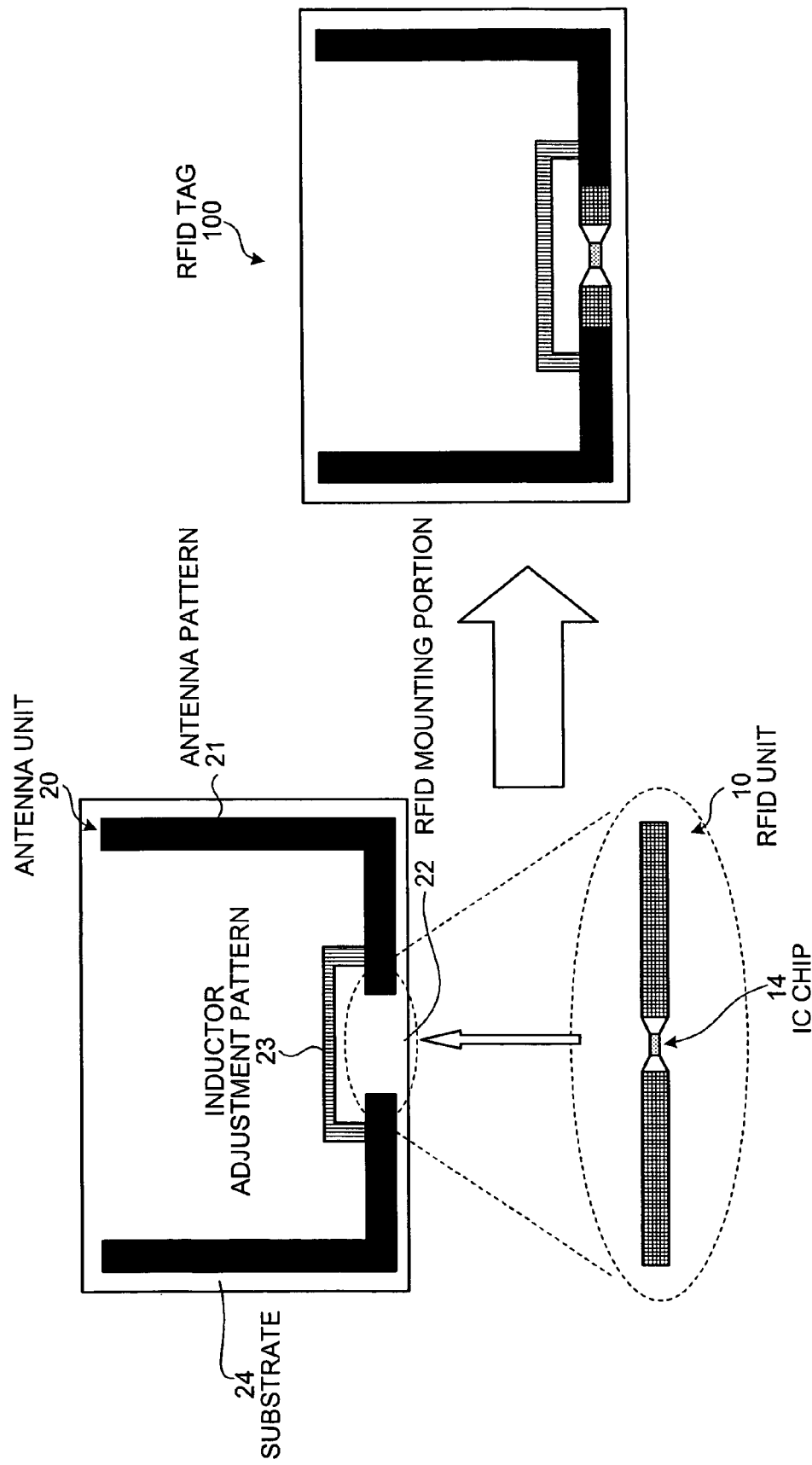
FIG. 1 is a schematic of an RFID tag according to a first embodiment of the present invention.

FIG. 1 is a schematic of an RFID tag according to a first embodiment of the present invention. As shown in FIG. 1, an RFID tag 100 includes an IC chip unit including an IC chip and an antenna unit including an antenna pattern. The main feature of the RFID tag 100 is that lengths of the IC chip unit and an RFID mounting portion in which the IC chip unit is mounted are standardized to a common length. With such structure, the IC chip units and the antenna unit can be mass-produced independently, thereby reducing manufacturing cost.

As shown in FIG. 1, an RFID unit 10 that includes an IC chip 14 has a pattern of a minute dipole antenna. A length of the RFID unit 10 is standardized to a predetermined length. Therefore, it can be manufactured independently of an antenna unit 20, irrespective of the material to which the RFID tag 100 is to be attached. The antenna unit 20 includes an antenna pattern 21, an RFID mounting portion 22, and an inductor adjustment pattern 23. A length of the RFID mounting portion 22 is standardized to coordination the length of the RFID unit 10. As the antenna unit 20 has a standardized length, it can be manufactured independently of the RFID unit 10 although the antenna pattern 21 and a position of the RFID mounting portion 22 vary depending on the material.

The RFID tag 100 is formed by mounting the RFID unit 10, which is independently manufactured, on the RFID mounting portion 22 of the antenna unit 20, which is also independently manufactured.

Figure 2:
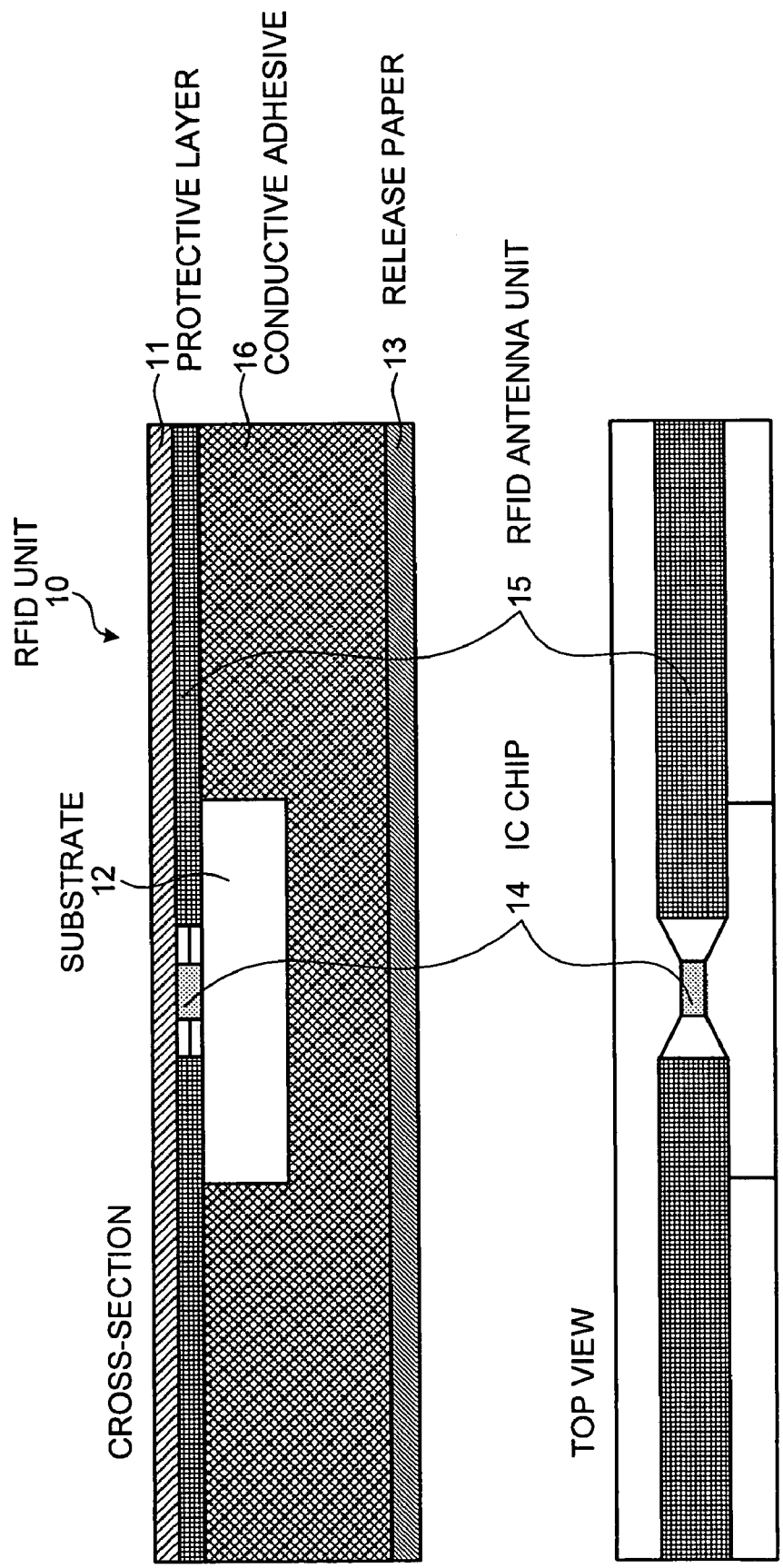
FIG. 2 is a schematic of an RFID unit according to the first embodiment.

FIG. 2 is a schematic of the RFID unit 10. As shown in FIG. 2, the RFID unit 10 includes a protective layer 11, a substrate 12, a release paper 13, the IC chip 14, an RFID antenna unit 15, and a conductive adhesive 16.

Specifically, the RFID unit 10 is formed in a form of a minute dipole antenna having a length to be suitable for transmitting and receiving radio waves having the shortest wavelength. The substrate 12 is arranged in a central portion of the RFID unit 10. The conductive adhesive 16 covers faces of the substrate 12 except one surface. On a surface formed with the substrate 12 and the conductive adhesive 16, the RFID antenna unit 15 is disposed. The RFID antenna unit 15 has the IC chip 14 in a central portion thereof. The protective layer 11 covers a surface formed with the IC chip 14 and the RFID antenna unit 15. The release paper 13 covers a bottom surface of the conductive adhesive 16.

The IC chip 14 includes a transceiving unit and a memory, and performs data reading and writing via the RFID antenna unit 15.

The RFID antenna unit 15 transmits and receives radio waves together with the IC chip 14 as well as the antenna pattern 21 of the antenna unit 20. Specifically, the RFID antenna unit 15 receives the instruction (for example, a read instruction, or a write instruction, transmitted by the RFID reader/writer via the antenna unit 20) to the IC chip 14, and transmits data read from the IC chip 14 to the RFID reader/writer. When mounted on the antenna unit 20, the RFID antenna unit 15 transmits the data read from the IC chip 14 to the RFID reader/writer together with the antenna pattern 21. The antenna unit 20 is formed with metal, such as copper, or a conductive material.

The substrate 12 functions as a mount for the IC chip 14 and the RFID antenna unit 15. Specifically, the RFID antenna unit 15 is etched on the substrate 12 and the IC chip 14 is then mounted thereon. The protective layer 11 covers a top surface formed by the IC chip 14 and the RFID antenna unit 15, and protects the RFID unit 10 (more specifically, the IC chip 14 and the RFID antenna unit 15) from external pressure. The protective layer 11 is formed with a thermal paper or a material such as polyethylene terephthalate (PET). Depending the material, printing can be carried out on a surface of the protective layer 11.

The conductive adhesive 16 bonds the RFID unit 10 and the antenna unit 20 together. The release paper 13 protects a surface of the conductive adhesive 16 to preserve its adhesiveness. When the RFID unit 10 is manufactured, the RFID unit 10 includes the release paper 13 adhered to the conductive adhesive 16. The release paper 13 is stripped off at the time of mounting the RFID unit 10 on the antenna unit 20.

Figure 3:
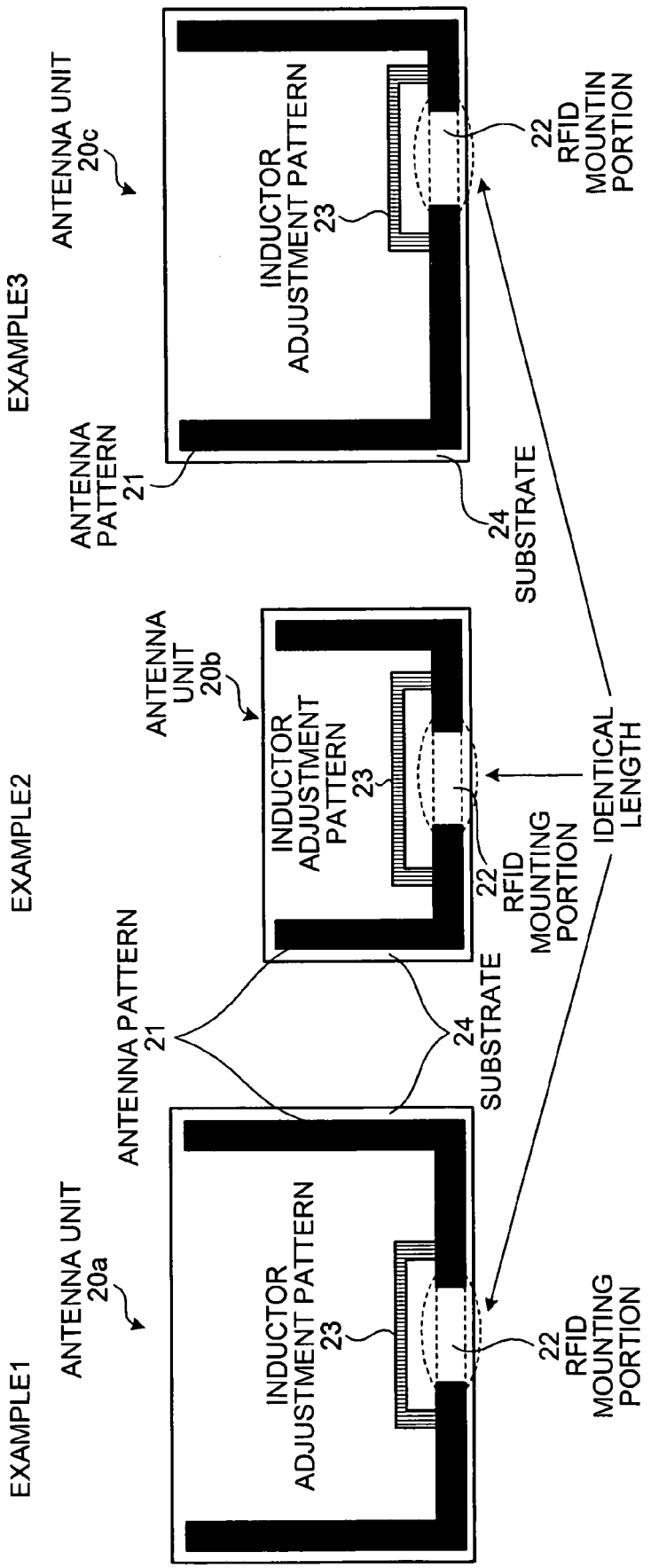
FIG. 3 is a schematic of an antenna unit according to the first embodiment.

FIG. 3 is a schematic of the antenna unit 20. The antenna unit 20 includes the antenna pattern 21, the RFID mounting portion 22, and the inductor adjustment pattern 23. The antenna pattern 21 and the inductor adjustment pattern 23 are formed with a conductive material such as copper and silver paste, and are formed on the substrate 24 by etching or printing.

Specifically, the antenna pattern 21 is arranged at both end of the RFID mounting portion 22. The RFID mounting portion 22 and the antenna pattern 21 form a shape of an open box as shown in FIG. 3. The inductor adjustment pattern 23 straddles the RFID mounting portion 22 to link the two antenna pattern 21 arranged on both ends of the RFID mounting portion 22.

The antenna pattern 21 transmits and receives radio waves together with the IC chip 14, as well as the RFID antenna unit 15. Specifically, the antenna pattern 21 receives instruction (for example, a read instruction, or a write instruction, transmitted by the RFID reader/writer) to the IC chip 14, and transmits data read from the IC chip 14 to the RFID reader/writer. The shape of the antenna pattern 21 may differ depending on the material (see FIG. 3).

The inductor adjustment pattern 23 functions to obtain coordination between the IC chip 14 and the antenna unit 20. The shape of the inductor adjustment pattern 23 may differ depending on the material.

The RFID mounting portion 22 is where the RFID unit 10 is mounted. The RFID unit 10 is mounted by bonding the conductive adhesive 16 of the RFID unit 10 to the RFID mounting portion 22. The position of the RFID mounting portion 22 may differ depending on the material, but the length of the RFID mounting portion 22 is a standardized length (see FIG. 3).

In other words, as shown in FIG. 3, the shape of the antenna pattern 20a through 20c and the position of the RFID mounting portion 22 are different depending on the material. However, as the length of the RFID mounting portion 22 is fixed irrespective of the shape of the antenna pattern 21 or the position of the RFID mounting portion 22, the antenna units 20a through 20c can be manufactured independently of the RFID unit 10.

Thus, according to the first embodiment, the RFID tag 100 includes the RFID unit 10 and the antenna unit 20 having a substantially identical length. Consequently, by standardizing the lengths of the RFID unit 10 and the RFID mounting portion 22, the RFID unit 10 and the antenna unit 20 can be mass-produced independently, irrespective of the internal layout of the RFID tag 100, which varies depending on a material to which the RFID tag 100 is to be attached. As a result, manufacturing cost can be reduced compare to a case in which the RFID unit and the antenna unit 20 are formed as an integrated unit.

According to the first embodiment, as the length of the RFID unit 10 is suitable for transmitting and receiving radio waves having the shortest wavelength, the RFID unit 10 alone may be used for transmitting and receiving the radio waves. Thus, only the RFID unit 10 may be manufactured first and tested prior to mounting the RFID unit 10 on the antenna unit 20.

According to the first embodiment, the RFID unit 10 is bonded to the antenna unit 20 by the conductive adhesive 16. Consequently, the RFID unit 10 and the antenna unit 20 are connected easily.

In the first embodiment of the present invention, the inductor adjustment pattern is a part of antenna unit. However, the inductor adjustment pattern is not thus limited and may be manufactured as an inductor unit, independently of the antenna unit. The antenna pattern in the present embodiment has the shape of an open box. However, the shape is not thus limited and the antenna pattern may be of any shape.

FIG. 4 is a schematic of an RFID tag according to the second embodiment. FIGS. 5 and 6 are schematics of the inductor unit according to the second embodiment.

The RFID tag 200 shown in FIG. 4 differs from the RFID tag 100 shown in FIG. 1 in that an antenna unit 40 of the RFID tag 200 has an inductor mounting portion 42 on which an inductor unit 30 is mounted. Although a form of the inductor unit 30 varies depending on the dielectric constant of the material or on the impedance of the antenna unit 40, the inductor unit 30 can be manufactured independently of the antenna unit 40 so as to be mounted on the inductor mounting portion 42. Because the inductor unit 30 can be manufactured independently to be suitable for the dielectric constant of the material or to the impedance of the antenna unit 40, it is possible to mount the inductor unit 30 having an optimal coordination to the antenna unit 40. The antenna unit 40 and an RFID unit 50 can also be independently manufactured.

The RFID tag 200 includes the inductor unit 30, the antenna unit 40, the RFID unit 50, and a substrate 44. Specifically, the inductor unit 30, which is independently manufactured, is mounted on the inductor mounting portion 42 of the antenna unit 40, which is also independently manufactured. The RFID unit 50 is then mounted on an RFID mounting portion 43 of the antenna unit 40. Thus, the RFID tag 200 is manufactured. An antenna pattern 41 and the inductor mounting portion 42 are formed with a conductive material such as copper and silver paste, and are formed on the substrate 44 by etching or printing.

Thus, the antenna unit 40 is provided with the inductor mounting portion 42, and the inductor unit 30 is mounted after the antenna unit 40 is manufactured. As a result, the inductor unit 30 suitable for the dielectric constant of the material or to the impedance of the antenna unit 40 can be mounted to obtain an optimal coordination.

As shown in FIG. 5, the inductor unit 30 includes a conductive adhesive 31, a release paper 32, and an inductor pattern 33. Specifically, the conductive adhesive 31 covers a bottom surface of the inductor unit 30 including the inductor pattern 33. The release paper 32 covers a bottom surface of the conductive adhesive 31.

The inductor pattern 33 functions to obtain coordination between the IC chip 14 and the antenna unit 40. As shown in FIG. 6, the shape of the inductor pattern 33 is varied depending on the dielectric constant of the material or the impedance of the antenna unit 40. However, the inductor unit 30 can be manufactured independently of the antenna unit 40 as the antenna unit 40 is provided with the inductor mounting portion 42. The inductor pattern 33 is formed with metal, such as copper, or a conductive material.

The conductive adhesive 31 bonds the inductor unit 30 and the antenna unit 40 together. The release paper 32 protects a surface of the conductive adhesive 31 to preserve its adhesiveness. When the inductor unit 30 is manufactured, the inductor unit 30 includes the release paper 32 adhered to the conductive adhesive 31. The release paper 32 is stripped off at the time of mounting the inductor unit 30 on the antenna unit 40, so that the conductive adhesive 31 is connected to the inductor mounting portion 42.

Thus, according to the second embodiment, the inductor mounting portion 42 is provided in the antenna unit 40 for mounting the inductor unit 30. Consequently, the inductor unit 30 can be mounted after the antenna unit 40 is manufactured, and before the RFID unit 50 is mounted to the antenna unit 40. Therefore, it is possible to make the inductor unit 30 to be mounted suitable, in advance, for the dielectric constant of the material to which the RFID tag 200 is to be attached or to the impedance of the antenna unit 40. Thus, it is possible to manufacture the RFID tag 200 having an optimal coordination.

The present invention is not limited to the embodiments described above, and various modifications may be applied.

While in the embodiments, the length of the RFID unit is made to be suitable for transmitting and receiving radio waves having the shortest wavelength, the length of the RFID unit may be any length.

While in the above embodiments, a conductive adhesive is provided on the RFID unit to bond to the antenna unit, other means may be employed to bond the RFID unit and the antenna unit.

According to the embodiments, mass-production of an IC chip unit and an antenna unit is possible, thereby reducing manufacturing cost.

Moreover, an IC chip unit can be tested before mounting the IC chip on an antenna unit.

Furthermore, the RFID unit and the antenna unit can be connected easily.

Moreover, it is possible to make an RFID tag having an optimally coordination between an antenna and an inductor.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio frequency identification tag, comprising:
    an RFID (radio frequency identification) unit including an IC chip and a dipole antenna; and
    a substrate having, on a surface of the substrate, an antenna pattern and a mounting portion on which the RFID unit is to be mounted, wherein:
    the RFID unit and the mounting portion have a substantially identical length; and
    the RFID unit further includes a conductive adhesive underneath the dipole antenna, to adhere the dipole antenna to the mounting portion, when the RFID unit is mounted on the mounting portion of the substrate.

2. The radio frequency identification tag according to claim 1, wherein the length of the RFID unit is set so as to make the IC chip capable of transmitting and receiving radio waves having the shortest wavelength.

3. The radio frequency identification tag according to claim 1, wherein the substrate includes an inductor mounting portion in which an inductor is mounted.

4. A method of manufacturing a radio frequency identification tag, comprising:
    mounting an RFID (radio frequency identification) unit having an IC chip, a dipole antenna, and a conductive adhesive underneath the dipole antenna, on a separate substrate having, on a surface of the separate substrate, an antenna pattern and a mounting portion on which the RFID unit is to be mounted; and
    adhering the RFID unit to the mounting portion via the conductive adhesive, as the RFID unit is mounted on the separate substrate.

5. A method according to claim 4, further comprising:
    forming an inductor adjustment pattern on the separate substrate, wherein the inductor adjustment pattern connects portions of the antenna pattern.

6. An RFID (radio frequency identification) unit comprising:
    an IC chip which has terminals;
    a dipole antenna electrically connected to the terminals;
    a conductive adhesive applied to the dipole antenna; and
    a release paper covering a surface of the conductive adhesive, wherein the release paper is released when the conductive adhesive is attached to an antenna unit that has a pair of antenna patterns so as to electrically connect the dipole antenna to the pair of antenna patterns.

7. The method according to claim 4, further comprising:
    removing a release paper covering a surface of the conductive adhesive, when mounting the RFID unit on the separate substrate.

8. A radio frequency identification tag, comprising:
    a substrate having an antenna pattern interrupted by an RFID mounting portion; and
    an RFID (radio frequency identification) unit having an IC chip in a central portion, a dipole antenna in end portions, and a conductive adhesive underneath the dipole antenna, to adhere the dipole antenna to portions of the antenna pattern neighboring the RFID mounting portion, while the IC chip is disposed on top of the RFID mounting portion,
    wherein the RFID mounting portion has a predetermined length correlated with lengths of the RFID unit.

9. The radio frequency identification tag of claim 8, further comprising:
    an inductor formed on the substrate to connect to portions of the antenna pattern neighboring the RFID mounting portion, via a conductive adhesive layer.

* * * * *